April 8, 1941.	H. P. ARNT, SR	2,237,955
FOOD HANDLING APPARATUS
Filed May 20, 1938	4 Sheets-Sheet 1

INVENTOR
Herald P. Arnt.
BY Maréchal & Noe
ATTORNEYS

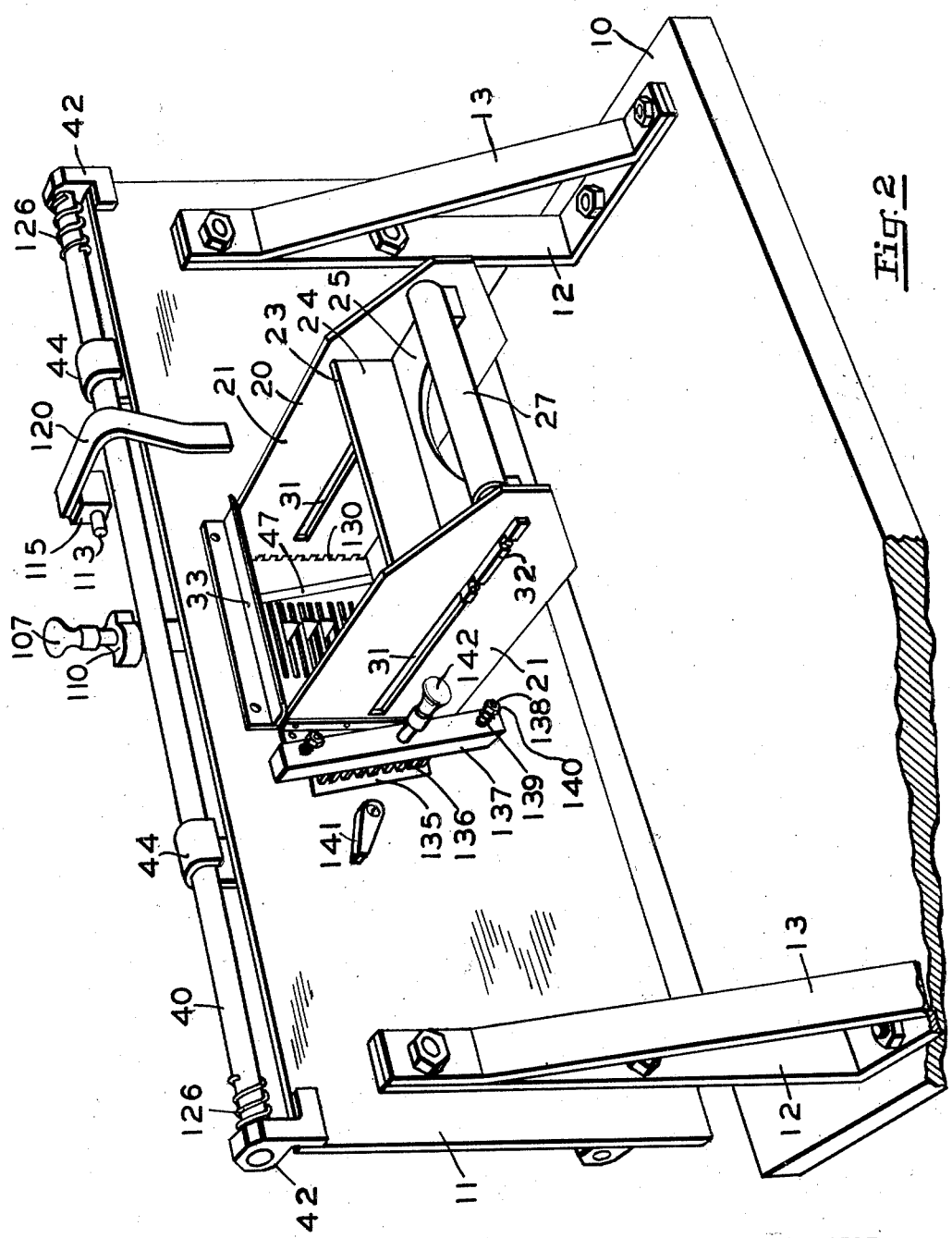

April 8, 1941.  H. P. ARNT, SR  2,237,955
FOOD HANDLING APPARATUS
Filed May 20, 1938  4 Sheets-Sheet 3
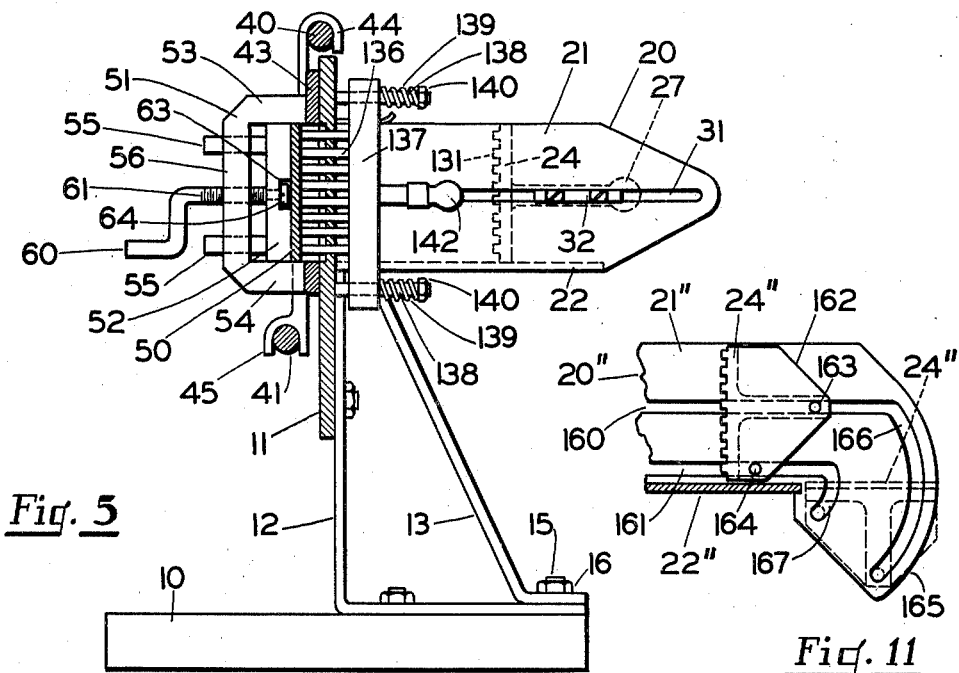
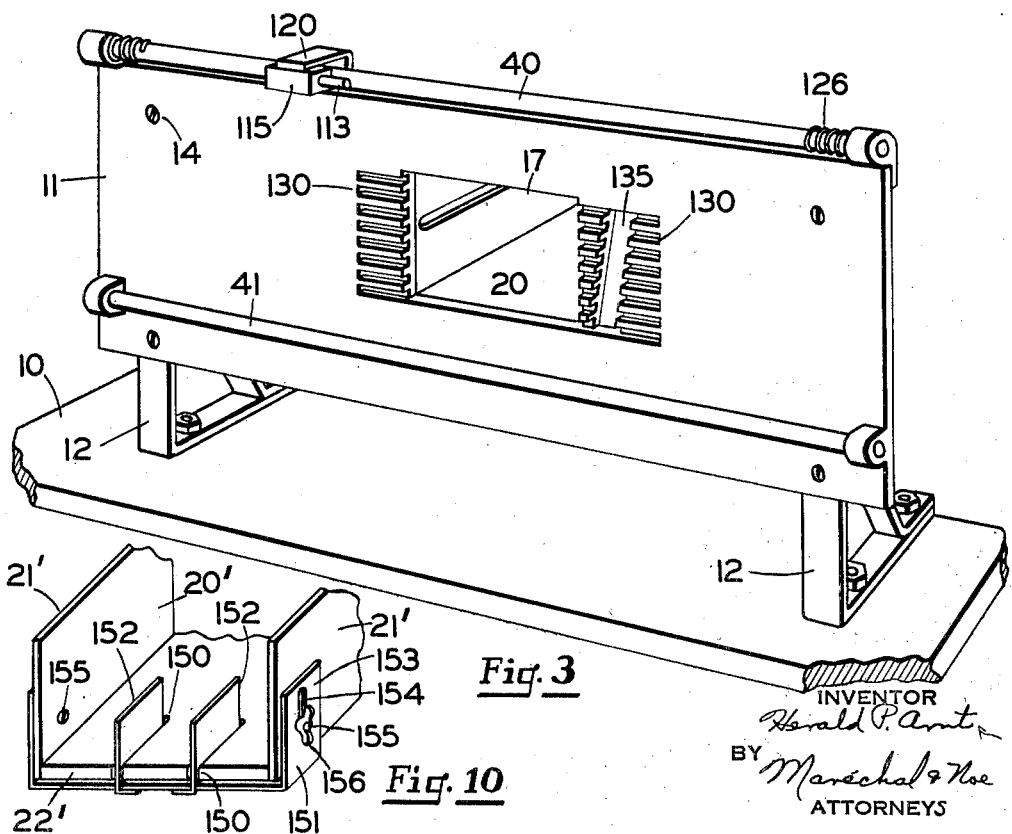

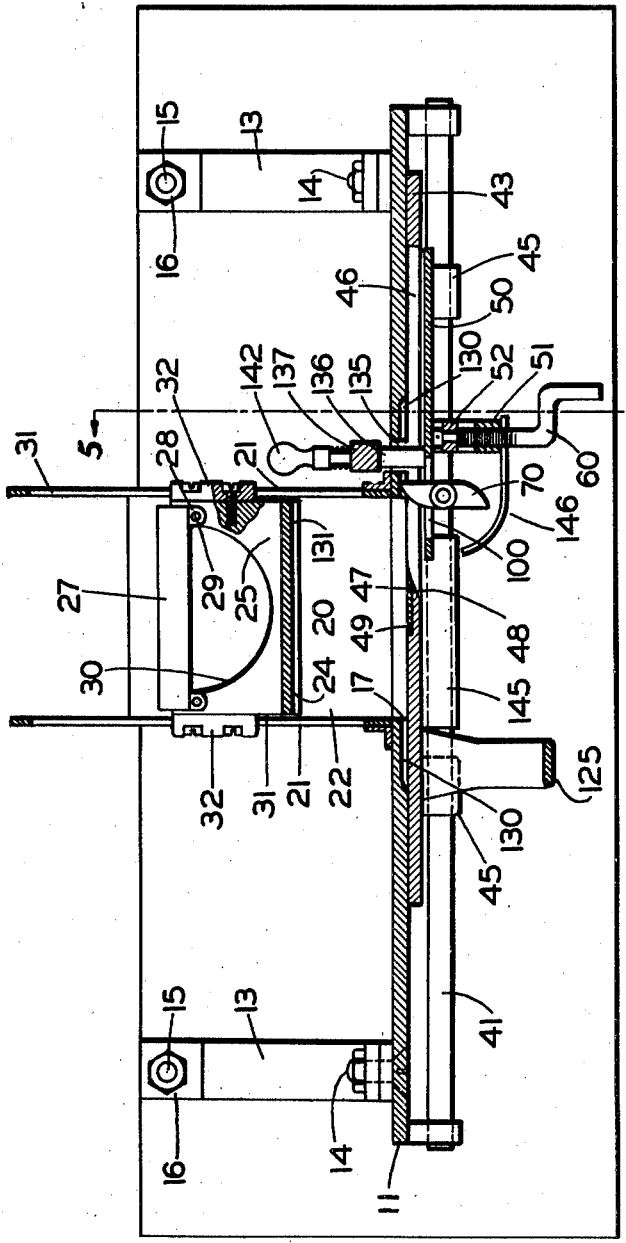

Patented Apr. 8, 1941

2,237,955

UNITED STATES PATENT OFFICE 2,237,955

FOOD HANDLING APPARATUS

Herald P. Arnt, Sr., Litchfield, Mich., assignor to The Hobart Manufacturing Company, Troy, Ohio, a corporation of Ohio Application May 20, 1938, Serial No. 209,111

14 Claims. (Cl. 146—78)

The present invention relates to slicing machines and more particularly to a machine for slicing and cutting potatoes, vegetables, fruit and the like.

A primary object of the present invention is the provision of a hand operated vegetable cutter suitable for domestic or restaurant use which is simple in construction and operation, which may be readily and conveniently adjusted to obtain the desired thickness of slice and to cut the vegetable into slices of the desired number and size, and which is easily maintained in a clean and sanitary condition.

A further object of the invention is to provide a vegetable cutter of this character having slicing and scoring knives which are mounted for reciprocatory movement in a vertical plane with the work material being fed laterally into the cutter in position for ready accessibility for the operator.

A further object is the provision of a reciprocating vegetable cutter of this character in which the scoring knives are automatically moved into scoring position during the forward cutting stroke of the device and into nonscoring position during the return stroke of the device.

Another object of the invention is the provision of a reciprocating vegetable cutter of this character having an article hopper in which the scoring knives are arranged in a plurality of sets having the knives of the different sets spaced apart by different distances for slicing different thicknesses and in which a selected set of the knives is automatically moved into scoring position during the forward stroke and withdrawn from scoring position on the return stroke assuring an unscored surface on the article at the beginning of each cutting stroke so that the position of the article with respect to the hopper may be readjusted as required.

Other objects and advantages will be apparent from the following description, the appended claims, and the accompanying drawings, in which:

Fig. 2 is a perspective view taken from the opposite side of the vegetable cutter shown in Fig. 1;

Fig. 3 is a perspective view taken from the same side as Fig. 1 and showing the vegetable cutter with the slide plate and structure associated therewith removed;

Fig. 4 is a horizontal sectional view taken along the line 4—4 of Fig. 1;

Fig. 5 is a vertical section taken on the line 5—5 of Fig. 4;

Fig. 6 is a detail view showing the scoring knife assembly in perspective;

Fig. 8 is a detail view, partly in section, showing the mechanism for limiting rotation of the scoring knives;

Fig. 9 is a detail view, partly in section, showing the mechanism for automatically rotating the scoring knives into a cutting position at the end of the return stroke of the cutter;

Fig. 10 is an angular elevational view of a food hopper for the vegetable cutter provided with means for dividing the hopper into a plurality of smaller compartments; and Fig. 11 is a fragmentary detail view showing a modified mounting for the pusher plate of the hopper.

Figures 1, 7:
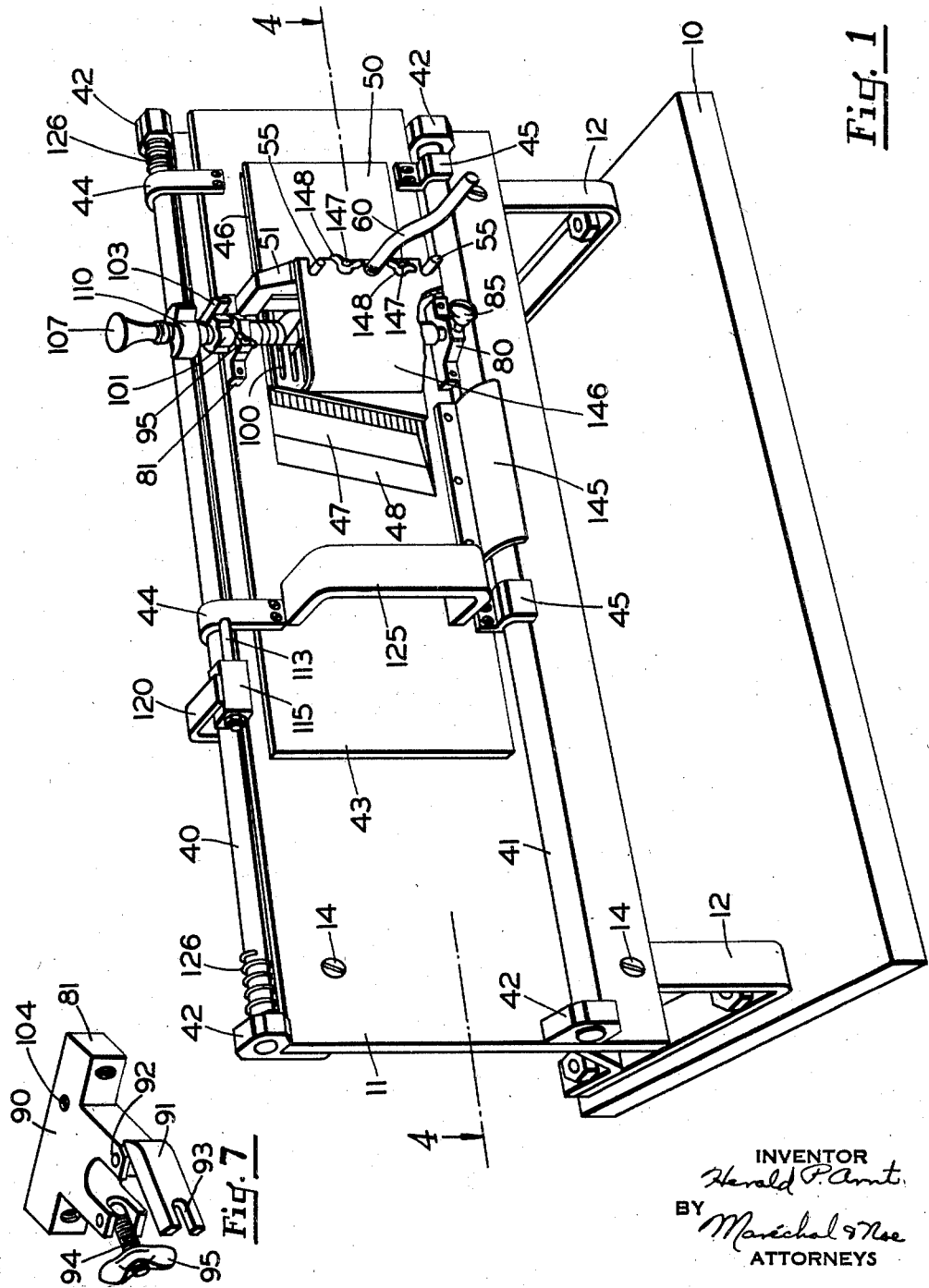
Fig. 1 is a perspective view taken from one side of a vegetable cutter constructed in accordance with the invention.
Fig. 7 is a perspective detail view showing the upper bearing for supporting the scoring knife assembly.

Referring to the drawings which illustrate a preferred embodiment of the invention there is shown a base 10 upon which a supporting frame plate 11 is mounted in a substantially vertical plane by means of the angle standards 12 and 13. The plate 11 is attached to the standards 12 and 13 by any suitable means such as the screws 14 and the standards are attached to the base by suitable means such as the studs 15 and the nuts 16. The supporting plate 11 is provided with a rectangular opening 17, best shown in Fig. 3, and a food hopper 20 is attached to one side of the plate 11 adjacent this opening.

As shown in Figs. 2, 4 and 5 the hopper 20 comprises an open topped trough-like member which extends laterally of the plate 11 and has vertical side walls 21 and a horizontal bottom wall 22. A hand operated article pusher 23 is positioned in the hopper and comprises a vertical pusher plate 24 and a rearwardly extending operating member 25. A gripping member 27 is attached to member 25 by suitable means such as ears 28 and screws or rivets 29 and the member 25 is provided with an arcuate opening 30 adapted to receive the fingers of the operator when his hand grips the member 27 to operate the pusher. The gripping member 27 is made round and smooth to provide a firm, convenient grip thereon and is preferably rolled from sheet metal as indicated in Fig. 2. For the purpose of guiding the pusher in its travel toward and away from the opening 17 in the plate 11 the side walls 21 of the hopper are provided with an elongated slot 31 and guiding lugs 32 bolted to the handle member 25 of the pusher plate are adapted to fit within and slide along the slots. The sides 21 and slots 31 extend outwardly beyond the end of the bottom 22 to permit the pusher plate to travel the full length of the hopper. A guard 33 is provided at the top of the hopper adjacent the plate 11 to protect the hands of the operator when placing vegetables or the like within the hopper and to guide the such foodstuffs into proper operative position to be scored.

A pair of spaced parallel slide rods 40 and 41 are carried on the side of the frame plate 11 adjacent the upper and lower portion thereof, and are fastened by means of lugs 42 attached to the plate 11. A slide plate 43 is removably mounted on the slide rods 40 and 41 for reciprocatory movement past the opening 17 of the plate 11. For this purpose the slide plate 43 is provided at its top adjacent each end with a hook-shaped strap 44 which is adapted to fit around the upper rod 40 and hang the slide plate therefrom. The slide plate 43 is also provided adjacent each end at the bottom with U-shaped downwardly opening stirrups 45 which are adapted to fit around and slide upon the lower slide rod 41. The slide plate 43 is provided with a substantially rectangular opening 46 and a slicing knife 47 is mounted within this opening adjacent the left hand side thereof as viewed in Fig. 1. The outer side of the slide plate at the left hand side of the opening 46 as viewed in Figs. 1 to 4 is preferably tapered towards the plate 11 as shown at 48 to guide the cut slices and the knife 47 fits within a recess 49 provided on the inner side of the slide plate opposite this tapered portion as shown in Fig. 4. The cutting edge of the slicing knife 47 is preferably inclined as shown in Figs. 1 and 2 to provide a shearing action during the cutting stroke.

A gage plate 50 for gaging the thickness of slice which the slicing knife 47 cuts is carried by the slide plate 43 and is movable within the opening 46 for adjustment towards and away from the plane of the cut-off knife 47. The gage plate 50 is carried by a substantially U-shaped yoke member 51 which is attached to the slide plate 43 by any suitable means such as countersunk screws and extends laterally from the plate 43 in a direction away from the plate 11. A guide bar 52 is attached to the gage plate 50 by suitable means such as countersunk screws and is adapted to slide within the upper and lower legs 53 and 54 respectively of the yoke member 51. Guide pins 55 are attached to the guide block 52 and extend outwardly through openings provided in the bight portion 56 of the yoke 51 and maintain the gage plate 50 parallel with the slide plate 43 and the frame plate 11.

The gage plate 50 is adjusted towards and away from the plane of knife 47 to provide the desired thickness of slice by means of a crank 60 which extends through the bight portion 56 of the yoke 51 and is provided with screw threads 61 which engage corresponding threads provided on the yoke 51. The crank 60 is rotatably attached to the guide bar 52. For this purpose the end of the crank adjacent the guide bar 52 is provided with a portion of reduced diameter which extends through an opening provided in the bar 52 and terminates within a slot 63 provided in this bar adjacent the gage plate 50. A collar or the like 64 is secured to the portion of the crank which extends into the slot 63 by suitable means such as a cotter pin or the like and together with the shoulder provided by the reduced portion of the crank prevents axial movement of the crank relative to the guide bar 52. The crank is free to rotate, however, within the bearing provided by the guide bar 52 and advances the guide bar and attached gage plate towards and away from the frame plate 11 and knife 47 when the crank is rotated within the yoke 51.

For the purpose of providing a scoring cut to divide the vegetable slice into a plurality of strips such as in the cutting of French fried or shoe string potatoes, a plurality of scoring knives 70 are carried by the slide plate 43 and are adapted to be reciprocated therewith in planes substantially at right angles to the plane of the slicing knife 47. In accordance with the present invention the scoring knives are so mounted upon the slide plate that the knives are automatically moved into a scoring position for the cutting stroke of the cutter and moved into a noncutting position during the return stroke of the cutter to prevent undesired scoring or other injury to the vegetable being cut. In the cutting of articles such as potatoes, the size and shape of the article changes with each cut such that when the article is moved forward in the hopper preliminary to each cutting stroke, the position thereof with respect to the hopper and the scoring knives is altered. If the scoring knives engage and cut the surface of the article on the return stroke, the scores thus made do not correspond with those made on the next forward stroke, and the slices are thus unsightly and non-uniform. In accordance with this invention however the scoring knives are automatically withdrawn from scoring position upon the return stroke so that no premature scoring of the article takes place, and the article may be moved to any desired position in the hopper at the beginning of each cutting stroke without incurring improper action of the knives.

The scoring knives are also provided in a plurality of sets in which the knives of one set are spaced apart by a greater distance than the knives of another set, the knife assembly being adjustable to provide for bringing one set or another into cutting relation, thereby affording a simple, rapid and conveniently operated means for varying the number and size of strips into which the slice is cut by the scoring knives.

Referring to Fig. 6 of the drawings, the scoring knives 70 are carried by a shaft 71 which is adapted to be rotatably supported on the slide plate 43. The desired spacing between the knives of the respective sets is obtained by means of spacing collars 72 which fit around the shaft 71 between the respective knives. The knives are rigidly attached to the shaft for rotation therewith by means of a collar 73 which is made integral with, or otherwise rigidly attached to, the shaft 71 and a clamping collar 74 which is rigidly attached to the shaft 71 by a force fit or other suitable means and clamps the knives in position. In the embodiment of the invention illustrated two sets of scoring knives are shown and alternate knives are omitted from one set to cut slices having twice the thickness of slices cut by the other set of knives. Where such an arrangement is used the knives of one set and the alternate knives of the other set may be made in one piece so as to provide a double bladed knife having one blade in each set. The cutting edges 75 of the scoring knives of one set face in an opposite direction to those of the other set so that upon rotation of the shaft 71 through an angle of 180° the cutting edges of each set will lie in a plane formerly occupied by the other set. It will be apparent, however, that any desired number, spacing and arrangement of the knives may be used.

The shaft 71 is rotatably mounted on the slide plate 43 by means of a socket 80 adapted to receive the lower end of the shaft and a bearing 81 adapted to receive the portion 82 of the shaft. The shaft 71 is provided near its lower end with a slot 84 within which the end of a thumb screw 85 carried by the socket 80 is adapted to extend to prevent accidental displacement of the shaft from the socket and to clamp the scoring knives in a nonscoring position. As best shown in Fig. 7 the bearing 81 comprises a main section 90 which is attached to the slide plate and opens laterally thereof and a cap section 91 which is pivoted at one side to the main section as shown at 92. The cap 91 is provided with a slot 93 at its opposite side within which a screw 94 pivoted on the main bearing section is adapted to fit. A wing nut 95 threads on the pivoted screw 94 and releasably clamps the two sections of the bearing together to provide a lateral support for the shaft 71 adjacent the upper portion of the slide plate. The socket 80 and bearing 81 support the shaft 71 in spaced relation to the slide plate 43 to permit full adjustment of the gage plate 50.

To permit either set of the scoring knives to be rotated into a cutting position relative to the opening 17 in the plate 11 the gage plate 50 is provided with a plurality of horizontal slots 100 which correspond in number and position to the greatest number of knives carried by the shaft 71 when mounted on the slide plate. When rotated to the cutting position the knives of the selected set extend through the slots 100 with the cutting edges 75 of the knives in a plane substantially perpendicular to the plane of the slide plate 43 as shown in the drawings. To maintain the knives in this position during the cutting stroke a stop mechanism is provided which limits counterclockwise movement of the selected set of knives as seen in Fig. 4 to an angle in which the cutting edges 75 extend through the slots 100 of the gage plate in a direction substantially perpendicular thereto, but permits clockwise rotation of the blades through an angle sufficient to bring the projecting blades into a protected and noncutting position outside of the gage plate on the return stroke.

Referring to Figs. 1, 6 and 8 a collar 101 is rigidly attached to the shaft 71 and is provided with a pair of diametrically opposed stop lugs 102. A latch arm 103 is pivotally mounted on bearing 81 at 104 (Fig. 7) by means of screw 104a, and is provided with a laterally projecting lug 105 adapted to extend into engaging relation with the stop lugs 102 to limit the angle through which the shaft 71 and knives 70 may be rotated. The arm 103 is normally urged to a position by means of a spring 106 in which the lug 105 is adapted to engage lug 102. The respective stop lugs 102 are so positioned relative to the respective sets of scoring knives that the selected set of knives can rotate in a counterclockwise direction only to the scoring position in which the cutting edges are at right angles to the plates 11 and 43. The spacing between the lugs 102 is such, however, that the knives can rotate in a clockwise direction through an angle sufficient to bring the blades outside of the gage plate.

The stop mechanism also includes means for selecting the set of scoring knives which will be used in the operation of the cutter. Referring to Fig. 8 it will be evident that as long as the lug 105 is in a position to engage the lugs 102 only a single set of the blades can be rotated into the cutting position. When it is desired to use the other set of blades to make the scoring cut the arm 103 is manually moved towards the right against the force of spring 106 to move lug 105 out of the path of lug 102, and the shaft 71 is then rotated by means of handle 107 through an angle sufficient to bring the lug 105 between the opposite sides of the stop lugs 102.

The automatic withdrawal of the scoring knives takes place as follows. During the return stroke of the cutter as soon as the back ends of the scoring knives 70 engage the vegetable or the like, the shaft 71 is caused to rotate in the socket 80 and bearing 81 to move the scoring knives into a noncutting position without defacing or cutting into the vegetable. A mechanism is provided for automatically moving the scoring knives into the cutting position prior to the next cutting stroke. For this purpose a collar 110 is rigidly attached to the shaft 71 above the collar 101 and is provided with a pair of laterally extending cam portions 111. The cam portions 111 are provided with diametrically opposed, radially extending faces 112 which are adapted to be engaged by a pin 113, carried by the stationary frame plate 11, when the slide plate 43 approaches the end of its return stroke. The collar 110 is so arranged on the shaft 71 that the radial faces 112 of the cam portions 111 lie in a plane which is substantially parallel to the cutting edges 75 of the scoring knives 70 so that when the knives 70 and stop lugs 102 have been rotated to the cutting position illustrated in Fig. 8 in which lug 102 engages lug 105 the cam faces 112 will occupy the position shown in Fig. 9 wherein they lie in a plane substantially perpendicular to the slide plate 43. When the scoring knives move to the noncutting position during a return stroke the shaft 71 rotates between the stop lugs 102 and causes the collar 110 and cam portions 111 to rotate in a clockwise direction from its position shown in Figs. 1 and 9. As the slide plate approaches the end of its return stroke the pin 113 engages the cam portion of the collar 110 and rotates the shaft to the position shown in Fig. 9 in which the lug 102 has engaged the lug 105 and the scoring knives are rotated to the scoring position, projecting perpendicularly through slots 100 in the gage plate.

The pin 113 for rotating the scoring knives to the cutting position is provided with a resilient mounting which is adapted to absorb shock when the lug 102 engages the lug 105. This mounting comprises a housing member 115 provided with a cylindrical bore within which the pin 113 is adapted to slide. A portion of the bore adjacent the end of the pin 113 which is adapted to engage the cam members 111 has a diameter which is substantially greater than the diameter of the pin 113, and the pin is provided with a collar-like portion 116 adapted to slide within this enlarged portion of the bore. A helical spring 117 is positioned around the shaft within this enlarged portion of the bore and is adapted to be compressed between the collar 116 and the shoulder 118 of the housing 115. A nut 119 threaded on the end of the pin 113 maintains the pin in position within the housing 115 and provides a means for adjusting the force normally exerted by the spring 117 on the collar 116. The housing 115 is supported on the frame plate 11 by means of a strap 120 which is attached to the rear face of the frame plate and extends upwardly and forwardly of the plate in spaced relation to the slide bar 40 to permit the strap 44 of the slide plate 43 to slide thereunder upon reciprocation of the slide plate. The strap 120 supports the housing 115 in position for the pin 113 to engage the face 112 of the cam 111 and rotate the scoring blades to the cutting position at the end of the return stroke of the slide plate.

The slide plate 43 is reciprocated by means of a handle 125 which is attached to the forward face of the plate. Helical springs 126 mounted on the slide bar 40 adjacent each end thereof provide resilient stops for the slide plate in both directions of travel. The springs 126 are compressed between the lugs 42 and the straps 44 and resiliently limit the motion of the slide plate at the end of the cutting and return strokes.

To insure a complete scoring of the vegetable slice the scoring knives 70 are of such length as to extend, when in the cutting position, inwardly of the plane of slicing or cut-off knife 47. To accommodate the ends of the scoring knives the frame plate 11 is provided adjacent each side of the opening 17 with a plurality of horizontally extending slots 130 corresponding in number and position to the slots 100 and knives 70. The slots 130 are of a depth and length sufficient to prevent any contact between the scoring knives and the metal of the plate 11 throughout the entire travel of the slide plate 43. To permit the scoring of the last slice the pusher plate 24 of the hopper 20 is adapted to be advanced to a position flush with the forward face of the plate 11 and is provided with a plurality of slots 131, as shown in Figs. 4 and 5, which correspond in number and position to the slots 130 and receive the ends of the scoring knives 70. The guide slots 31 of the hopper are of such length as to limit the forward movement of the pusher plate 24 to such flush position to prevent the unslotted portion of the plate being advanced into the path of the scoring knives.

To support the last slice during the scoring cut the plate 11 is provided with an opening 135 through which the teeth 136 of a comb 137 are adapted to extend. The comb 137 is slidably mounted on the rear face of plate 11 by means of pins 138, and coil springs 139 surround the pins 138 between the comb 137 and a nut 140 to normally urge the ends of the teeth 136 against the gage plate 59. The teeth 136 are so positioned on the comb 137 and are of such thickness that the spaces between the teeth correspond to the slotted portions 130 and 131 of the plates 11 and 24 respectively and provide passages for the scoring knives 70. To permit the comb 137 to be positioned as close as possible to the opening 17 and at the same time prevent contact between the slicing knife 47 and the teeth 136 of the comb, the opening 135 is preferably provided with an inclination corresponding to the inclination of the cutting edge of the slicing knife 47 and the teeth 136 are correspondingly arranged. The stops 126 for the slide plate are so arranged as to stop the cut-off knife short of engagement with the teeth of the comb. A stop block 141 is pivoted on the rear face of the plate 11 adjacent the comb 137 and is adapted to be rotated into a position between the plate 11 and comb 137 to hold the teeth in a retracted position should it be desired not to use the comb. The comb is retracted by means of handle 142.

A shield 145 is attached to the slide plate 43 below the opening 46 and adjacent the slicing knife 47 to guide the cut vegetables or the like over the slide bar 41 into a suitable receptacle positioned below the cutter on the base member 10. To serve as protection against the scoring knives 70 a guard plate 146 is mounted on the yoke member 51 and extends in protective relation around the exposed portions of the scoring knives. A pair of studs 147 extend outwardly from the yoke 51 and the guard member is provided with a plurality of notches adjacent one side thereof adapted to receive the guide pins 55, crank 60 and studs 147. Wingnuts 148 thread on the studs 147 and clamp the guard against the yoke member 51. When it is desired to remove the guard member it is only necessary to loosen the wingnuts 148 and slide the guard laterally to free the notches of the various parts received therein.

In Fig. 10 there is shown a means for dividing the hopper 20' into a plurality of small compartments each adapted to support a vegetable during the slicing and scoring cut. Referring to this view the bottom 22' of the hopper is provided with a pair of spaced slots 150 extending substantially parallel with the side walls 21'. A U-shaped member 151 extends around the bottom and side walls on the exterior of the hopper and carries a pair of partition plates 152 adapted to extend upwardly into the interior of the hopper through the slots 150. The side portions 153 of the member 151 which lie adjacent the sides 21' of the hopper are provided with a vertical slot 154 having a length equal to the distance which the plates 152 extend above the bottom 22' of the hopper. A stud or the like 155 is provided on each of the walls 21' and is adapted to extend through the slots 154. Wingnuts 156 thread on the studs 155 and clamp the member 151 to the side walls of the hopper. The slot 154 permits the member 151 to be moved from the position illustrated in which the partition plates 152 extend into the interior of the hopper and divide the hopper into a plurality of smaller compartments adapted for the cutting of a small vegetable such as carrots or the like, to a lower position in which the tops of the plates 152 are substantially flush with the upper face of the bottom 22' to provide a full size compartment for the cutting of larger vegetables such as potatoes or the like. To adjust the position of the member 151 and plates 152 it is only necessary to loosen the wingnuts 156 and move the member 151 to the desired position. With this structure, the pusher plate will be provided with suitable slots to receive the several partition plates.

In Fig. 11 there is shown a guide and supporting means for the pusher plate of the hopper which permits the pusher plate to be swung to a position substantially flush with the bottom of the hopper at the exterior end thereof to facilitate cleaning and the like. Referring to this view the side walls 21'' of the hopper 20'' are provided with a pair of longitudinally extending slots 160 and 161. The pusher plate 24'' is provided with side members 162 extending rearwardly thereof adjacent the sides 21'' of the hopper and these members are provided with pins 163 and 164 adapted to slide within the slots 160 and 161, respectively, to guide the pusher plate in its movement towards and away from the opening in the frame plate 11. The pin 163 is positioned in a vertical plane located further to the rear of the pusher plate than the vertical plane passing through the pin 164. The sides 21" of the hopper extend rearwardly beyond the bottom 22" of the hopper and are provided at the rear ends thereof with arcuate projections 165 which extend downwardly below the bottom 22" of the hopper. The slot 160 extends further into the overhanging portions of the side walls 21" than the slot 161 by a distance equal to the spacing between the vertical planes passing through the pins 163 and 164. The downwardly projecting ends 165 of the side walls 21" are provided with concentric arcuate slots 166 and 167 which form extensions of the slots 160 and 161, respectively. The arcuate slots 166 and 167 are spaced apart by a distance equal to the straight line distance between the pins 163 and 164. From the foregoing description it will be evident that when the pusher plate has been moved to its outermost position in which the pins 163 and 164 are at the ends of the longitudinal slots 160 and 161 the plate may be swung downwardly in the arcuate slots 166 and 167 to the position shown in dotted lines in Fig. 11 wherein the plate 24" is positioned substantially flush with the bottom 22" of the hopper. Such positioning of the of the pusher plate provides for thorough and rapid cleaning of both the hopper and the forward face of the pusher plate and further provides for feeding without using the pusher plate if desired.

In the operation of the cutter the crank 60 is rotated to adjust the gage plate 50 to provide the desired thickness of slice, and the desired set of scoring knives is selected by releasing latch 103 and rotating shaft 71 by means of handle 107. A vegetable or the like is then placed within the hopper 20 and the slide plate 43 is reciprocated on the slide bars 40 and 41 by means of handle 125 while the pusher plate 24 is inwardly towards the gage plate by means of handle 27. The vertical arrangement of the supporting plate 11 provides for an operation which is most convenient for the operator to perform with his hands and which permits easy and convenient adjustment of the gage plate and scoring knives from a side of the cutter in full view of the operator, thereby avoiding the necessity for indicators or the like. Prior to the cutting stroke the scoring knives 70 are rotated to the cutting position by means of the pin 113 and cam members 111 and are maintained in such position during a cutting stroke by means of the lugs 102 and 105. Upon the return stroke the back edges of the scoring knives engage the vegetable or the like being cut and rotate the knives 70 and shafts 71 to a noncutting position thereby avoiding injury to the material being operated upon. At the end of the return stroke the pin 113 and cam 111 again return the selected set of scoring knives to the cutting position for the next cutting stroke. The springs 126 mounted on the slide bar 40 resiliently limit the travel of the slide plate in both the cutting and return strokes. The pusher plate 24 is guided in the slots 31 and can be moved forward to a position in which the slots 131 thereof are coincident with the slots 130 of the plate 11. The teeth 136 of the comb 137 are normally urged into engagement with the gage plate and provide a lateral support for scoring the last slice of a vegetable or the like. The comb may if desired be retracted from its operative position and maintained in the inoperative position by means of the stop block 141.

When it is desired to remove the scoring knives it is only necessary to loosen the wingnuts 85, 95 and 148, remove the guard 146, swing the cap section 91 of the bearing 81 outwardly and lift the shaft 71 from the socket 80 by means of handle 107. When it is desired to remove the slide plate for cleaning of the slicing knife 47, gage plate 50 and hopper 20 it is only necessary to lift upwardly on the plate to disengage the hooks 44 and stirrups 45. Reassembly of the cutter merely involves the reverse operations and is as simple, quick and convenient as the disassembly thereof.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a slicing machine of the character described, hopper means provided with a discharge opening, supporting means for said hopper means, a slicing knife carried by said supporting means in operative relation to said discharge opening, a scoring knife carried by said supporting means in a plane substantially perpendicular to the plane of said slicing knife, said supporting means providing for relative reciprocating movement between said hopper means and said slicing and scoring knives to provide a cutting stroke and a return stroke for said knives relative to said discharge opening, means supporting said scoring knife for movement from a cutting to a noncutting position relative to said discharge opening, said scoring knife being adapted to move to the noncutting position during said return stroke, and means operable by the relative reciprocating movement between said hopper means and said scoring knife for moving said scoring knife into said cutting position for said cutting stroke.

2. In a slicing machine of the character described, hopper means provided with a discharge opening, a support for said hopper means, a reciprocating slide carried by said support to provide a cutting stroke and a return stroke, a slicing knife carried by said slide for reciprocatory movement past said discharge opening, a shaft carried by said slide, a plurality of scoring knives mounted on said shaft, supporting means for said shaft providing for rotation of said knives from a cutting position to a noncutting position relative to said discharge opening during the return stroke of said slide, and means operable at the beginning of the cutting stroke of said slide for rotating said scoring knives into said cutting position for the cutting stroke of the slide.

3. In a slicing machine of the character described in which a slicing knife and a plurality of spaced scoring knives arranged in planes substantially perpendicular to the plane of the slicing knife are reciprocated in a plurality of cutting strokes and return strokes relative to the discharge opening of a hopper to slice and score a vegetable or the like, a shaft supporting said scoring knives, supporting means for said shaft providing for rotation of said knives from a cutting position to a noncutting position relative to said discharge opening during the return stroke of the knives, and means operable at the end of the return stroke for rotating said scoring knives into said cutting position for the cutting stroke thereof.

4. In a slicing machine of the character described, hopper means provided with a discharge opening, a support for said hopper means, a reciprocating slide carried by said support, movable in a cutting stroke and a return stroke, a slicing knife carried by said slide for reciprocatory movement past said discharge opening, a shaft carried by said slide, a plurality of scoring knives mounted on said shaft, means supporting said shaft for free rotation of said scoring knives from a cutting position to a noncutting position relative to said discharge opening during the return stroke of said slide, stop means associated with said shaft for limiting rotation of said scoring knives and maintaining said knives in a cutting position during the cutting stroke, and means cooperating with said shaft and operable for rotating said scoring knives into said cutting position for the cutting stroke of the slide.

5. In a slicing machine of the character described, hopper means provided with a discharge opening, a support for said hopper means, a reciprocating slide carried by said support to provide a cutting stroke and a return stroke, a slicing knife carried by said slide for reciprocatory movement past said discharge opening, a shaft carried by said slide, a plurality of scoring knives mounted on said shaft in a plurality of angularly arranged sets, the knives of one set having a spacing different from the spacing of the knives of another set, means supporting said shaft for free rotation of each of said sets of scoring knives from a cutting position to a noncutting position relative to said discharge opening during the return stroke of said slide, stop means associated with said shaft for limiting rotation of said sets of scoring knives to permit only a selected set to be rotated into said cutting position and to maintain said selected set in the cutting position during the cutting stroke of the slide, means cooperating with said shaft and operable by movement of said slide for rotating the selected set of scoring knives into said cutting position for the cutting stroke of the slide, and means for disengaging said stop means to permit rotation of said shaft to select the set of scoring knives adapted to be moved into and out of said cutting position upon reciprocation of said slide.

6. In a slicing machine of the character described, a supporting frame mounted in a substantially vertical plane, a slide carried by said frame and mounted for reciprocatory movement thereon in a substantially vertical plane, a slicing knife carried by said slide, a hopper carried by said frame laterally thereof, said hopper comprising bottom and side walls and having a discharge opening lying in the plane of said frame, a pusher plate for said hopper, means supporting and guiding said pusher plate for movement towards and away from said discharge opening, and means positioned remote from said discharge opening and cooperating with said supporting and guiding means for swinging said pusher plate into a plane substantially coincident with the plane of said bottom.

7. In a slicing machine of the character described, a supporting frame mounted in a substantially vertical plane, a slide carried by said frame and mounted for reciprocatory movement thereon, knife means carried by said slide, a hopper carried by said frame laterally thereof, said hopper comprising bottom and side walls and having a discharge opening lying in the plane of said frame, a supporting member extending around the side and bottom walls of said hopper, said hopper bottom being provided with a slot therein, a partition carried by said supporting member and adapted to extend upwardly through said slot to divide said hopper into a plurality of smaller compartments, the portions of said supporting member adjacent the side walls of the hopper being provided with elongated slots and clamping means extending through said elongated slots for supporting said partition in either a raised or lowered position relative to the interior of said hopper.

8. A slicing machine of the character described comprising a supporting base, a hopper for receiving material to be sliced and having a discharge opening, a slicing knife arranged in operative relationship with respect to said discharge opening and work material contained in said hopper, scoring knife means arranged in a plane substantially perpendicular to the plane of said slicing knife and adapted to effect a scoring cut upon work material contained in said hopper at said discharge opening upon operation of the slicing machine, means for mounting said hopper and said slicing and scoring knives on said base for relative reciprocation of said hopper with respect to said slicing and scoring knives to effect successive cutting and return movements of the knives relative to said discharge opening and the work material within the hopper, said mounting means including supporting means for said scoring knife means providing for free movement of said knife means during said return movement from an operative position in which the scoring knife extends into cutting relation with respect to work material in the hopper to an inoperative non-scoring position relative to said work material, said scoring knife means being moved from said operative cutting position during said return movement under action of work material contained in said hopper, and means effective at a predetermined point in the cycle of relative movement between the hopper and the slicing and scoring knives for restoring said scoring knife means to the operative cutting position for cutting operation upon a subsequent cutting stroke.

9. A slicing machine as defined in claim 8 in which said scoring knife means comprises a supporting shaft, a plurality of scoring knives projecting from said shaft and arranged in a plurality of sets, the knives of one set being angularly related to and having a spacing different from the knives of another set, and said knife mounting means including provision for angular adjustment of said supporting shaft to a predetermined angular position to select a desired one of said plurality of sets of knives for actuation to operative and inoperative positions in the course of said reciprocating movement.

10. In a slicing machine of the character described, a supporting frame mounted in a substantially vertical plane, a hopper carried by said frame laterally thereof and having a discharge opening lying in the plane of said frame, a slide plate, knife means carried by said slide plate, and means for removably mounting said slide plate in a substantially vertical plane on said supporting frame for reciprocatory movement of said knife means with respect to said discharge opening over a predetermined stroke of movement comprising a pair of vertically spaced substantially horizontal slide bars carried by said frame, upper and lower supporting means carried by said slide plate and having guide portions adapted to fit over and rest upon said respective slide bars to guide and support said slide and assembled knife means for reciprocation thereon, said guide portions of the upper and lower supporting means being constructed with openings at one side thereof providing for direct upward lifting and lateral removal of the slide plate and said assembled knife means from and replacement thereof upon said slide bars within the limits of said stroke of movement to facilitate cleaning of the machine.

11. In a slicing machine of the character described, a supporting frame mounted in a substantially vertical plane, a hopper carried by said frame laterally thereof and having a discharge opening lying in the plane of said frame, a slide plate, a slicing knife carried by said slide plate, a plurality of scoring knives mounted on said slide plate, and means for removably mounting said slide plate in a substantially vertical plane on said supporting frame for reciprocatory movement of said slicing and scoring knives with respect to said discharge opening over a predetermined stroke of movement comprising a pair of vertically spaced substantially horizontal slide bars carried by said frame, a supporting member extending upwardly from said slide plate and having a guide portion adapted to fit over and slide upon the upper of said slide bars, a supporting member extending downwardly from said slide plate and having a guide portion adapted to fit over and slide upon the lower of said slide bars, said guide portions resting on said respective slides under the action of gravity and each of said portions having an opening at one side thereof to provide for direct removal and replacement of the slide plate together with the knives carried thereby within the limits of said stroke of movement by merely lifting said supporting members off of said slide bars and replacing the same thereon, and handle means carried by said slide plate to effect reciprocatory movement thereof on said slide bars and facilitate removal and replacement of the slide plate.

12. In a slicing machine of the character described, a supporting base, a hopper for receiving material to be sliced and having a bottom wall and opposite side walls, knife means extending in a substantially vertical plane for slicing said material, means for mounting said hopper and said knife means on said base for relative reciprocation of said hopper with respect to said knife means to effect the slicing of material moved through said hopper in a substantially horizontal plane, said bottom wall of said hopper having an elongated longitudinal slot therein, a supporting member extending beneath the bottom wall and across said slot, means upon the outside of said side walls for adjustably fastening said supporting member in operative position thereon, and a partition carried by said supporting member and adapted to extend upwardly through said slot in the operative position thereof and spaced from and out of contact with the inside surface of said side walls for dividing said hopper into a plurality of smaller compartments.

13. In a slicing machine of the character described, hopper means provided with a discharge opening, a support for said hopper means, a reciprocating slide carried by said support and reciprocable with respect to said hopper means in a cutting stroke and a non-cutting return stroke, a slicing knife carried by said slide for reciprocatory movement past said discharge opening, a gage plate carried by said slide extending across said discharge opening for gaging the depth of cut to be made, said gage plate being provided with slots extending longitudinally thereof and substantially parallel to the path of movement of said slide, a shaft also carried by said slide, a plurality of scoring knives mounted on said shaft, means for rotatably supporting said shaft with said knives in operative position extending through the slots of said gage plate and into scoring position upon the cutting stroke of said slide, said supporting means providing for free movement of said scoring knives from said operative cutting position to an inoperative position with the knives withdrawn into said slots, and means effective at a predetermined point in the cycle of relative movement and the slicing and scoring knives for restoring said scoring knife means to the operative cutting position for cutting operation upon a subsequent cutting stroke.

14. In a slicing machine of the character described, hopper means provided with a discharge opening, a support for said hopper means, a reciprocating slide carried by said support and reciprocable with respect to said hopper means in a cutting stroke and a non-cutting return stroke, a slicing knife carried by said slide for reciprocatory movement past said discharge opening, a gage plate carried by said slide extending across said discharge opening for gaging the depth of cut to be made, said gage plate being provided with slots extending longitudinally thereof and substantially parallel to the path of movement of said slide, a shaft also carried by said slide, a plurality of scoring knives mounted on said shaft, means for rotatably supporting said shaft with said knives in operative position extending through the slots of said gage plate and into scoring position upon the cutting stroke of said slide, said supporting means providing for free movement of said scoring knives from said operative cutting position to an inoperative position with the knives withdrawn into said slots, means for adjusting the gage plate transversely of the slide while retaining the slicing and scoring knives in fixed position relative to the slide to provide for varying the depth of cut, and means effective at a predetermined point in the cycle of relative movement and the slicing and scoring knives for restoring said scoring knife means to the operative cutting position for cutting operation upon a subsequent cutting stroke.

HERALD P. ARNT, Sr.